US008820043B2

(12) United States Patent
Adams et al.

(10) Patent No.: US 8,820,043 B2
(45) Date of Patent: Sep. 2, 2014

(54) METHOD FOR HEATLESS MANUFACTURE OF HORSESHOES

(71) Applicants: Rozanne E Adams, Joseph, OR (US); Alan Dale, Joseph, OR (US)

(72) Inventors: Rozanne E Adams, Joseph, OR (US); Alan Dale, Joseph, OR (US)

(*) Notice: Subject to any disclaimer, the term of this patent is extended or adjusted under 35 U.S.C. 154(b) by 201 days.

(21) Appl. No.: 13/621,689

(22) Filed: Sep. 17, 2012

(65) Prior Publication Data
US 2013/0068485 A1   Mar. 21, 2013

Related U.S. Application Data

(60) Provisional application No. 61/535,930, filed on Sep. 16, 2011.

(51) Int. Cl.
*B21K 15/02* (2006.01)
*B21H 7/12* (2006.01)
*A01L 11/00* (2006.01)

(52) U.S. Cl.
CPC .................................... *A01L 11/00* (2013.01)
USPC ............................ 59/36; 59/37; 59/59; 59/61

(58) Field of Classification Search
CPC ........... B21K 15/02; B21H 7/12; A01L 11/00
USPC ............................................ 59/36, 37, 59, 61
See application file for complete search history.

(56) References Cited

U.S. PATENT DOCUMENTS

| 5,319,918 | A | * | 6/1994 | Baur et al. | 59/61 |
| 5,727,376 | A | * | 3/1998 | Backman | 59/62 |
| 6,454,016 | B1 | * | 9/2002 | Julien | 59/61 |

* cited by examiner

*Primary Examiner* — David B Jones

(57) ABSTRACT

A method for cold manufacturing horseshoes utilizes a laser cutter, a hydraulic press, and a sanding belt to cut horseshoes from a sheet of material without heating up the sheet of material. Information, including dimensions of the horseshoe as well as position and size of a plurality of nail holes, is fed into a control computer for the laser cutter. The laser cutter cuts an outline of the horseshoe from the sheet of material, as directed by the control computer. The laser cutter also creates nail outlines, providing a guide for the second step involving the hydraulic press. Once the nail outlines are created an appropriately sized punch is selected for the hydraulic press. The hydraulic press uses the punch to bore through the outlines, creating beveled nail holes. The horseshoe is then moved to a sanding belt, where a rear surface and edge of the horseshoe is sanded smooth.

5 Claims, 6 Drawing Sheets

Nail holes are cut into a rectangular shape by the laser cutter.

Nail holes are beveled to resemble the shape of a nail head.

METHOD FOR HEATLESS MANUFACTURE OF HORSESHOES

The current application claims a priority to the U.S. Provisional Patent application Ser. No. 61/535,930 filed on Sep. 16, 2011.

FIELD OF THE INVENTION

The present invention relates generally to a method of manufacturing horseshoes. More specifically, the present invention is a cold method of manufacturing horseshoes utilizing a laser cutter and hydraulic press.

BACKGROUND OF THE INVENTION

Commonly, a method known as drop forging is used to manufacture horseshoes. The drop forging method involves pouring molten metal into a horseshoe-shaped mold, or heating flat iron to the appropriate temperature to allow a blacksmith to shape and stamp holes. A common problem with this current method is that metal becomes crystallized at the high temperatures required to work the metal, which makes the resulting horseshoe more brittle and prone to wear. Also, flat iron which has been heated and bent has a tendency to try and revert to its original straight condition, causing the horseshoe to become misshapen over time. In addition, methods such as drop forging are prone to variations of size and weight, due to the difficulty of achieving high precision with hot forging. Though some cold forging methods exist, many of them share some drawbacks with hot forging methods, or introduce their own issues.

It is therefore an object of the present invention to introduce a cold method of manufacturing horseshoes where the shoe is cut from a cold rolled flat sheet metal utilizing a laser cutter. It is a further object of the present invention to introduce a cold method of manufacturing horseshoes where the produced horseshoes have the exact same size and weight each time. It is a further object of the present invention to introduce a cold method of manufacturing horseshoes to produce more durable horseshoes, where the lack of crystallization, heat, and bending result in more durable horseshoes that hold their shape.

DETAIL DESCRIPTIONS OF THE INVENTION

All illustrations of the drawings are for the purpose of describing selected versions of the present invention and are not intended to limit the scope of the present invention.

The present invention is a cold method for manufacturing horseshoes from sheets of material without heating said materials, as is often done in order to shape and form horseshoes. The term "cold method" pertains to the lack of forging or heat work in the present invention. The present invention uses a laser cutter to cut outlines of horseshoes from a sheet of cold material. The laser cutter is also used to cut outlines of nail holes within the outline of the horseshoe. After the laser cutter creates outlines for the horseshoe and nails, a hydraulic press is used to bore through the nail outlines to create nail holes in the horseshoe. The horseshoe is then finished by having a rear surface and edge sanded smooth with a sanding belt. In this manner, a horseshoe can be constructed without heating up the material used to make the horseshoe, providing an alternative to various hot forging methods such as drop forging.

In order to employ the present invention, several pieces of equipment and information must be provided. The necessary equipment includes the laser cutter, the hydraulic press, and the sanding belt. The laser cutter comprises a control computer, which receives instructions and controls the laser cutter accordingly. The hydraulic press comprises a plurality of punches, with each of the punches being a different size. The information that must be provided includes blueprints for a horseshoe, specifying a set of horseshoe dimensions and overall shape as determined by a user, as well as the sizing and positioning for a plurality of nail holes. The blueprints depend on the breed of horse that is to be shod with the manufactured horseshoe, as different shoe shapes are necessary for different horse types. The present invention also requires a material from which to make the horseshoe. The material used is cold rolled (i.e. it has not been heated) into a flat state. The material itself can be a metal such as steel, although it is not limited to such. Since the horseshoe is being cut from the sheet of cold material, the sheet of cold material should have the same thickness as required for the horseshoe in the provided blueprints, with thicker or thinner sheets of cold material being utilized accordingly.

Figure 1:
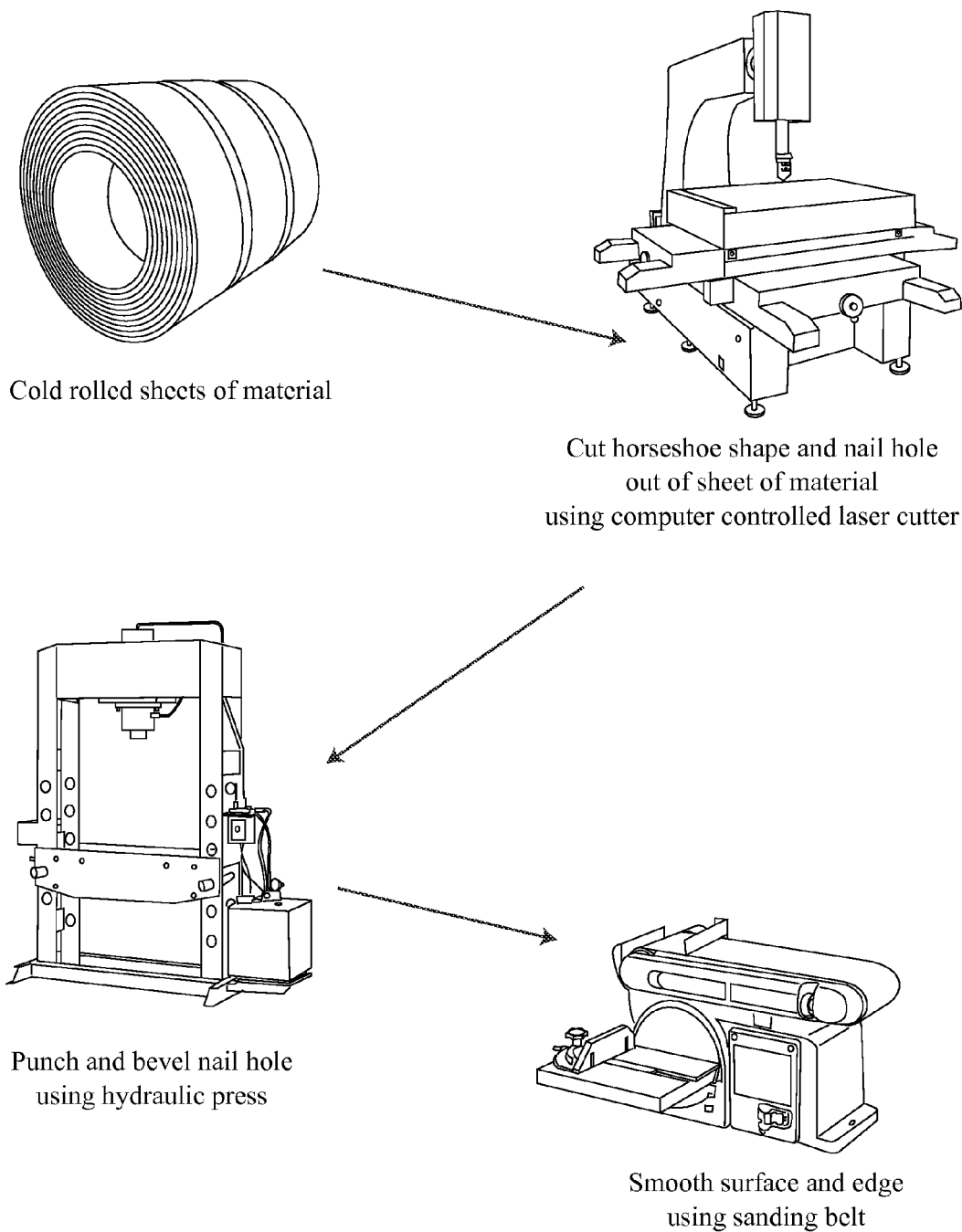
FIG. 1 is an illustration of the overall process of the present invention.

After the necessary equipment, information, and materials have been prepared, the process can begin. There are three general steps to the process, illustrated in FIG. 1. In the first step the laser cutter is used to cut the horseshoe from the sheet of cold material. In the second step, the hydraulic press is used to punch nail holes in the horseshoe. Finally, during the third step, a sanding belt is used to smooth parts of the horseshoe. Afterwards, the horseshoe is ready to be inspected, packaged, and sold.

Figure 2:
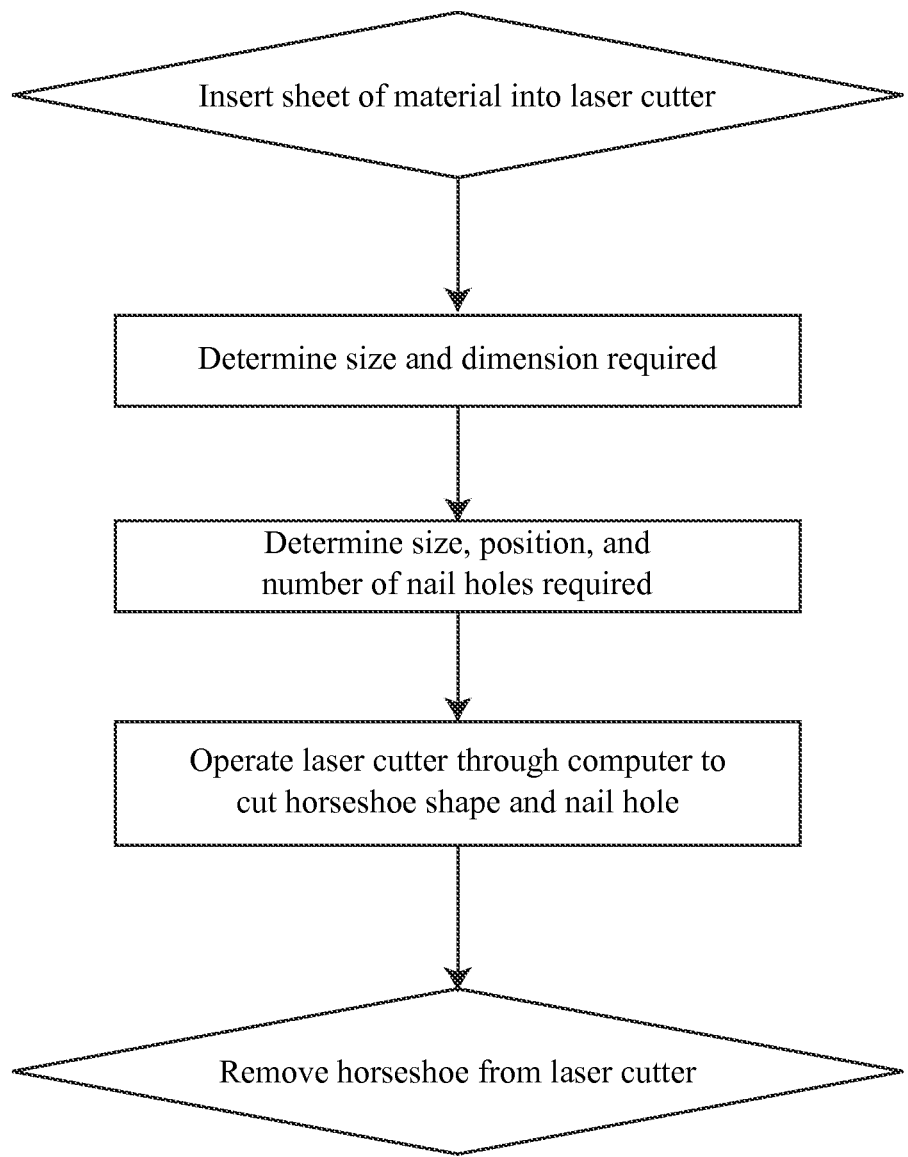
FIG. 2 is a flow chart illustrating the first process of the present invention.
Figure 5:
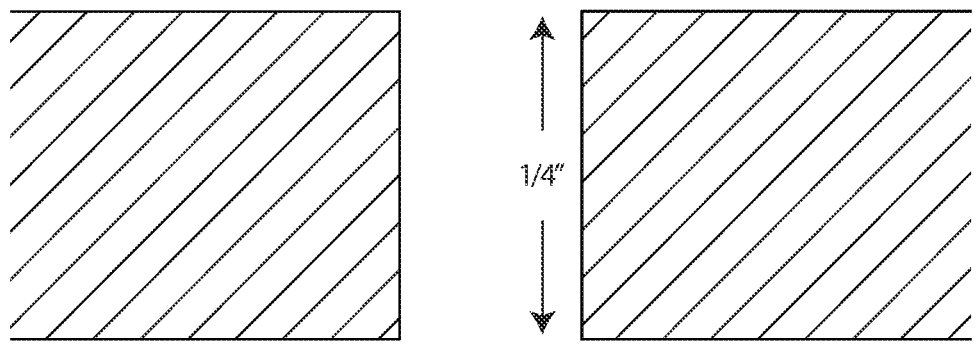
FIG. 5 is a cross-sectional view of a nail hole after the first step of the present invention.

In the first step, which is summarized in FIG. 2, the information from the blueprints is fed into the control computer for the laser cutter. This data can be input to the control computer by automated methods, such as image processing, or manual methods like numerical entry. The provided information will allow the control computer to guide the laser cutter when cutting the outline of the horseshoe and when cutting the outlines for the plurality of nail holes. After the control computer has been fed the information related to the horseshoe dimensions and nail hole positioning, the sheet of cold material is moved to the laser cutter. Once the sheet of cold material is in position, the laser cutter is activated. Subsequently, the outline of the horseshoe is cut from the cold rolled sheet of material, with the control computer directing the laser cutter so that the cuts follow the dimensions in the provided blueprints. Similarly, the control computer will instruct the laser cutter to make incisions within the outline of the horseshoe, with said incisions forming outlines for the plurality of nail holes, an example of which is shown in FIG. 5. The resulting nail holes are square in shape, with perpendicular sides. These incisions, as with the outline, are made according to the blueprints initially provided to the control computer.

Figure 3:
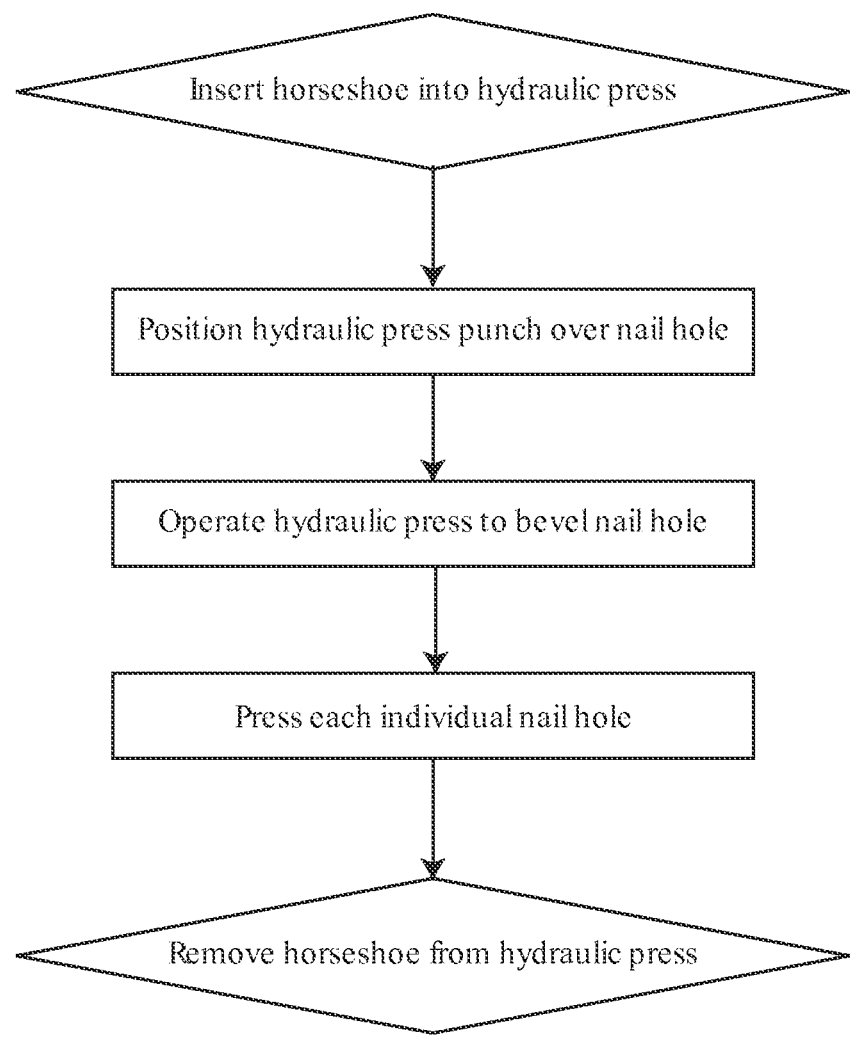
FIG. 3 is a flow chart illustrating the second process of the present invention.

At the end of the first step, the shape of the horseshoe has been cut from the sheet of cold material. In addition, outlines for the plurality of nail holes will have been etched into the horseshoe in preparation for the second step of the process. At this point, the horseshoe is removed from the sheet of cold material and is ready for the second step of the process, as outlined in FIG. 3. Before proceeding to the second step, the laser cutter is deactivated.

Figure 6:
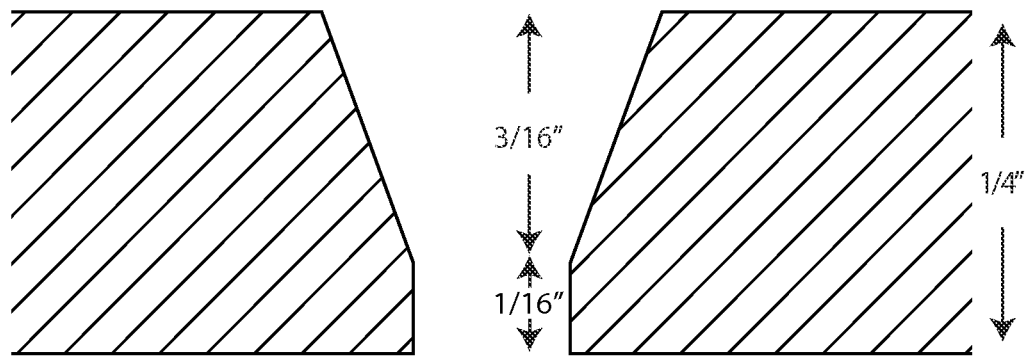
FIG. 6 is a cross-sectional view of the nail hole after the second step of the present invention.

For the second step, the cut horseshoe is moved to the hydraulic press. Each of the nail hole outlines, etched by the laser cutter, is then successively aligned with the punch of the hydraulic press. To begin, a first nail hole outline from the plurality of nail outlines is selected. An outline size of the first nail outline, identical to the size of the corresponding nail hole in the blueprints, is used to select a first punch from the plurality of punches. The first punch, like each of the plurality of punches, is shaped to resemble a nail head, beveling the corresponding nail hole, like shown in FIG. 6. This first punch has a punch size that is equivalent to the outline size of the first nail hole. After selecting and equipping the first punch, the horseshoe is moved to align the first nail outline with the first punch. Once the first nail outline and the first punch are in alignment, the hydraulic press is activated. The hydraulic press drives the first punch down into and through the first nail outline, then retracts the punch from the newly created first nail hole, beveling the perpendicular sides of the nail outline. This is due to the shape of the punch, resulting in the first nail hole having a nail hole bevel that forms an angled recess to receive and provide a close fit for a corresponding nail head. The resulting nail hole, as well as further nail holes, is formed as an overall square shaped hole with rounded corners.

The process used to bore the first nail hole is repeated for each of the remaining nail outlines. A next nail outline is selected from the plurality of nail outlines, as well as a next punch. The next punch has a punch size that is identical to the outline size of the next nail outline. The horseshoe is then moved so that the next nail outline is in alignment with the next punch. The hydraulic press is then activated to drive the next punch into, through, and back out of the next nail outline, resulting in a beveled next nail hole. The boring of nail holes continues until a last nail outline is remaining. Once again, a last punch with a punch size corresponding to the last nail outline is selected. The last nail outline and last punch are aligned, and the hydraulic press is activated. The last punch is driven into and through the last nail outline, then reversed to pull the last punch out of the newly beveled last nail hole.

Figure 4:
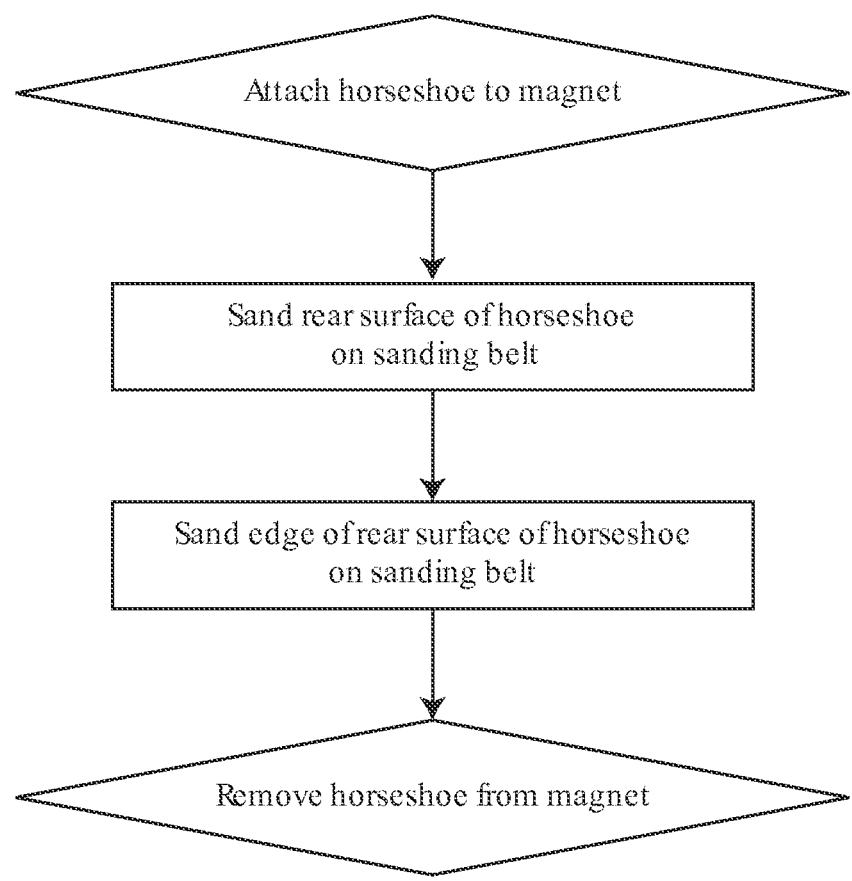
FIG. 4 is a flow chart illustrating the third process of the present invention.

Once the last nail hole is bored and beveled, the second step is complete. The full shape of the horseshoe has been created, with the plurality of nail holes bored and beveled to fit appropriately sized nails. At this point, the horseshoe is removed from the hydraulic press and is prepared for the third and final step of the process, which is illustrated in FIG. 4. Prior to beginning the final step, the hydraulic press is powered down.

For the third step the horseshoe is moved to the sanding belt, where the horseshoe is secured to a magnet. The magnet can be adjusted, either by rotation or sliding, allowing a user to manipulate the angle between the horseshoe and the sanding belt. Once the horseshoe is secured to the magnet, the sanding belt is activated. The rear surface of the horseshoe (the surface that will come into contact with the ground) is then pressed against the sanding belt in order to smooth the rear surface of the horseshoe. After smoothing the rear surface, the edge of the rear surface is pressed against the sanding belt. The user then proceeds to smooth the edge of the rear surface. After the rear surface and corresponding edge of the horseshoe have been smoothed, the sanding belt is shut down and the horseshoe is removed from the magnet. The horseshoe is completed and is ready for use. A horse is clod with the manufactured horseshoe by simply nailing the horseshoe into a hoof, with the rear surface facing away from the hoof. The plurality of nail holes, including bevels, allow the nails to easily be hammered through and secured to the horseshoe.

The method presented provides several advantages to existing methods. Because the horseshoe is cut by a laser, the cuts are extremely precise, resulting in each produced horseshoe having the exact same weight and size, plus or minus $\frac{1}{1000}$th of an inch. In addition, the cold method of manufacture means that metal horseshoes will wear better due to not undergoing crystallization. The cold method of manufacture also means the horseshoes will hold their shape better when compared to hot forged horseshoes, since the present invention does not require the bending of heated metal. The sanding of the rear surface and edge is intended to reduce frictional resistance between the horseshoe and ground when an equipped horse is walking or trotting. The smoothed rear surface can also deter possible injury if a horse clod with the manufactured horseshoe kicks another horse.

In addition to the process described above, in other embodiments the present invention could be carried out manually or entirely automated. For example, a control computer could be provided for the hydraulic press, including software capable of detecting nail outlines and aligning them with the appropriate nail punch. The method could be implemented in an assembly line, with machines running constantly rather than being shut down after each individual step. Potentially, in a fully automated environment, the nail outlines would not be needed and image processing could be used to instruct the hydraulic press in boring the nail holes. These are just a few examples of changes that could be made for other embodiments.

Although the invention has been explained in relation to its preferred embodiment, it is to be understood that many other possible modifications and variations can be made without departing from the spirit and scope of the invention as hereinafter claimed.

What is claimed is:

1. A method for heatless manufacture of horseshoes comprises the steps of:

providing a sheet of cold material, a laser cutter, a hydraulic press, and a sanding belt, wherein the laser cutter comprises a control computer;

providing a set of horseshoe dimensions for a horseshoe;

providing a hole size and a hole position for each of a plurality of nail holes;

inputting the set of horseshoe dimensions into the control computer;

inputting the hole size and the hole position for each of the plurality of nail holes into the control computer;

placing the sheet of cold material in the laser cutter;

cutting an outline of the horseshoe from the sheet of cold material by activating the laser cutter;

creating a plurality of nail outlines in the horseshoe by activating the laser cutter;

removing the horseshoe from the sheet of cold material, wherein the horseshoe is formed by the outline cut by the laser cutter;

transferring the horseshoe from the laser cutter to the hydraulic press;

boring the plurality of nail holes by activating the hydraulic press;

transferring the horseshoe from the hydraulic press to the sanding belt; and smoothing a rear surface of the horseshoe by activating the sanding belt, wherein the rear surface is a surface of the horseshoe that comes in contact with the ground during use.

2. The method for heatless manufacture of horseshoes as claimed in claim 1 comprises the steps of:

cutting the outline of the horseshoe by having the control computer instruct the laser cutter in making cuts in the sheet of cold material according to the set of horseshoe dimensions;

positioning each of the plurality of nail outlines by using the control computer to instruct the laser cutter to make cuts in the sheet of cold material according to the hole position for each of the plurality of nail holes; and determining an outline size for each of the plurality of nail outlines by using the control computer to instruct the laser cutter to make cuts in the sheet of cold material according to the hole size for each of the plurality of nail holes.

3. The method for heatless manufacture of horseshoes as claimed in claim 1 comprises the steps of:

providing a punch size for each of a plurality of punches for the hydraulic press;

choosing a first nail outline from the plurality of nail outlines;

selecting a first punch from the plurality of punches by matching the punch size of the first punch with the outline size of the first nail outline;

aligning the first nail outline from the plurality of nail outlines with the first punch of hydraulic press;

controlling the hydraulic press to drive the first punch through the first nail outline to create a nail hole bevel in a first nail hole;

choosing a next nail outline from the plurality of nail outlines;

selecting a next punch from the plurality of punches by matching the punch size of the next punch with the outline size of the next nail outline;

aligning the next nail hole from the plurality of nail holes with the next punch of the hydraulic press;

controlling the hydraulic press to drive the next punch through the next nail outline to the nail hole bevel in a next nail hole;

choosing a last nail outline from the plurality of nail outlines;

selecting a last punch from the plurality of punches by matching the punch size of the last punch with the outline size of the last nail outline;

aligning the last nail outline from the plurality of nail outlines with the last punch of the hydraulic press; and controlling the hydraulic press to drive the last punch through the last nail outline to create the nail hole bevel in a last nail hole.

4. The method for heatless manufacture of horseshoes as claimed in claim 1 comprises the steps of:

securing the rear surface of the horseshoe against the sanding belt; and smoothing the rear surface and an edge of the rear surface by angling the horseshoe in relation to the sanding belt.

5. The method for heatless manufacture of horseshoes as claimed in claim 4 comprises the step of:

securing the horseshoe against the sanding belt by using a magnet.

\* \* \* \* \*